United States Patent [19]

Gemp

[11] 4,181,877
[45] Jan. 1, 1980

[54] INERTIA COMPENSATED STATIC MOTOR DRIVE

[75] Inventor: Robert S. Gemp, Williamsville, N.Y.

[73] Assignee: Westinghouse Electric Corp., Pittsburgh, Pa.

[21] Appl. No.: 970,297

[22] Filed: Dec. 18, 1978

Related U.S. Application Data

[63] Continuation of Ser. No. 743,830, Nov. 22, 1976, abandoned.

[51] Int. Cl.$^2$ .......................... H02P 5/16; H03K 4/08
[52] U.S. Cl. .................................. 318/345 R; 242/45; 318/6; 328/185
[58] Field of Search ...................... 318/6, 345; 328/35, 328/36, 181, 185; 242/45, 75, 51, 25; 307/228

[56] References Cited

U.S. PATENT DOCUMENTS

| | | | |
|---|---|---|---|
| 3,007,055 | 10/1961 | Herzfeld | 328/185 |
| 3,233,397 | 2/1966 | Bonikowski | 242/75.51 |
| 3,304,705 | 2/1967 | Rathje et al. | 242/45 |
| 3,440,566 | 4/1969 | Swanson | 328/36 |
| 3,579,274 | 5/1971 | Jensen et al. | 328/181 |
| 3,713,009 | 1/1973 | Poppinger et al. | 318/6 |
| 3,800,203 | 3/1974 | Pedersen et al. | 307/228 |
| 3,814,310 | 6/1974 | Saeiuddin | 318/6 |
| 3,869,658 | 3/1975 | Hanke et al. | 321/2 |

Primary Examiner—David Smith, Jr.
Attorney, Agent, or Firm—C. M. Lorin

[57] ABSTRACT

A load is driven by a statically controlled motor drive so as to follow a linear ramp characteristic recurrently, and a jump is caused to occur after each peak of the controlling ramp signal in order to compensate for inertia in the driven load. The inertia compensating jump is adjustable independently from the ramp parameters, and each ramp parameter is adjustable independently from the others as well as from the adjustment of the jump.

3 Claims, 8 Drawing Figures

INERTIA COMPENSATED STATIC MOTOR DRIVE

This is a continuation of application Ser. No. 743,830, filed Nov. 22, 1976 for INERTIA COMPENSATED STATIC MOTOR DRIVE by applicant, now being abandoned.

BACKGROUND OF THE INVENTION

The present invention relates to motor control in general, and more particularly to control of the speed of a motor above and below a predetermined speed reference cyclically as typical in the textile industry where yarn being wound on a bobbin must accommodate for regular length variations in the yarn feed, while being moved back and forth along the bobbin, in order to evenly spread the fiber.

In order to obtain such a winding pattern, the arm guiding the yarn must be moved in accordance with a saw-tooth waveform of a given frequency. However, the inertia of the load tends to smooth out the peaks of the required alternative movement imposed to the arm. The object of the present invention is to control a motor drive cyclically with predetermined decelerations and accelerations about a reference speed in such a way that inertia due to the load be automatically compensated.

It is known from U.S. Pat. No. 3,440,566 of H. I. Swanson to alter the triangular form of a saw-tooth command signal so as to create a jump after each peak introducing a change in slope compensating for the time delay in response of electronic tubes to be typically triggered by the command signal. A similar alteration of a saw-tooth command signal is used in accordance with the present invention, for the purpose of compensating for the inertia of the load driven by a motor drive. In addition, special provision is made for independent adjustment of the four parameters of such an altered saw-tooth, including the peak jumps, whereby a standard motor drive can be adjusted in the field to fit any particular load situation.

SUMMARY OF THE INVENTION

The present invention resides in a motor drive for recurrently and linearly changing the speed of a load having inertia in which a speed signal having a triangular waveform between peaks is cyclically generated and a jump of predetermined speed increment is caused to occur after each successive peak of said speed signal to compensate for the inertia of the load, whereby the load follows said triangular waveform characteristic.

The invention also resides in the provision of means for adjusting the speed jump occurring after each peak independently from the triangular waveform characteristic of the speed signal and in the provision of means for selectively adjusting the characteristic parameters of the triangular waveform of the speed signal independently from the speed jump occurring after each peak of the signal.

DETAILED DESCRIPTION OF THE INVENTION

Figure 1:
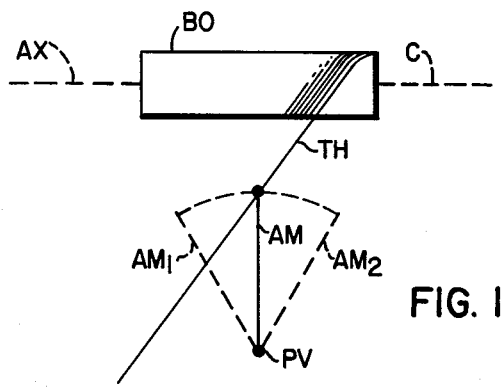
FIG. 1 schematically illustrates a driven load typically requiring a ramp signal for controlling the motor drive thereof.
Figure 2:
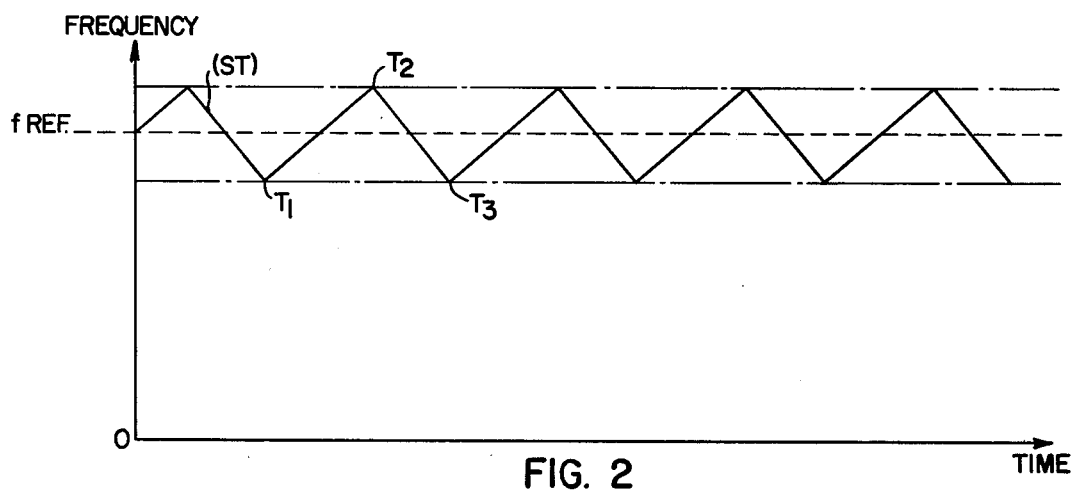
FIG. 2 shows a control signal typically required to be generated by the circuit according to the invention.
Figure 3:
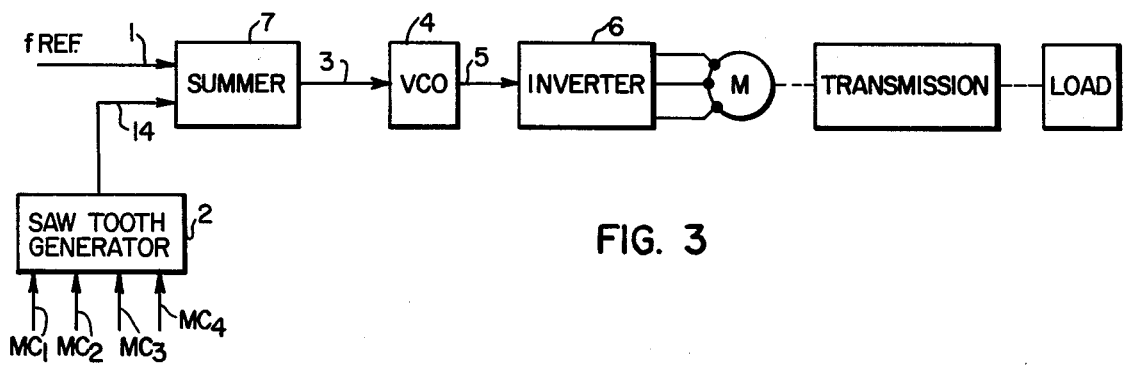
FIG. 3 schematically shows a motor drive coupled to a load and the control circuit according to the invention for controlling the motor drive.

FIG. 1 shows a bobbin BO mounted for rotation about an axis AX with an angular speed $\omega_c$. An arm AM supplies a continuous thread TH to be wound in several layers on the bobbin. According to general practice in the textile industry, in order to wind and spread the thread along the bobbin, the arm AM must be rotated back and fourth about a pivoting point PV between two extreme positions $AM_1$ and $AM_2$, at a frequency $f_{ref}$ in relation with the rotation speed of the bobin $\omega_c$. Positions $AM_1$ and $AM_2$ correspond to feed of the thread at either end of the bobbin BO. While moving the thread back and forth along the length of bobbin BO, it is clear that the thread feed is constant. However, in practice unless a certain ramdomness is achieved while winding uneven accumulations of yarn will occur. In order to overcome this problem it is good practice to jiggle the arm AM somewhat while it moves back and forth. This is achieved by regularly decelerating and accelerating the feed while it moves between the two extreme positions $AM_1$ and $AM_2$. The alternative motion of arm AM is generated by an induction motor, rotating at a constant speed defined by the reference frequency $f_{ref}$, coupled to a mechanical transmission converting rotative into alternative motion for actuation of the load. The pattern of acceleration and deceleration imposed on the arm AM preferably is according to a saw-tooth waveform such as (ST) in FIG. 2. A saw-tooth generator provides a saw-tooth control signal which is summed up with the $f_{ref}$ signal controlling the arm AM. However, the inertia of the load tends to smooth out the original saw-tooth characteristic which is lost when actually applied to the arm AM. Referring to FIG. 3, a saw-tooth generator 2 is shown summing its output with the reference signal $f_{ref}$ on line 1, through a summer 2. The output on line 3 is as shown in FIG. 2. This is the signal applied to a voltage control oscillator 4 which controls the frequency of operation of an inverter 6 statically converting DC current into AC current supplied to the induction motor M.

Figure 4:
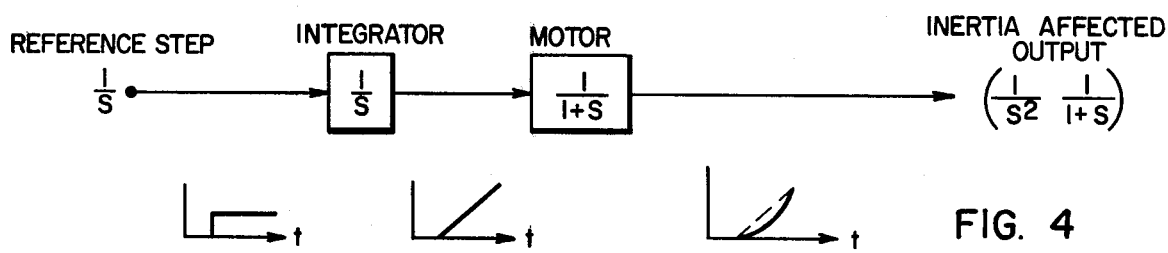
FIG. 4 shows an open loop including an integrator for the control of a motor having inertia.
Figure 5:
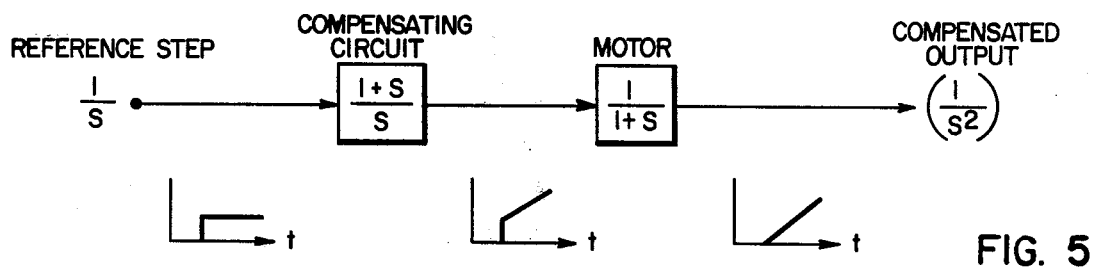
FIG. 5 shows the control loop of FIG. 4 assuming an inertia compensating circuit according to the invention has been inserted in the loop.

Referring to FIG. 4, if the inertia of the motor drive represents an exponential delay, the Laplacian term for the delay is $(1/1+S)$. In orer to generate a ramp signal the reference step $(1/S)$ is applied through an integrator $(1/S)$ resulting by transformation into $(1/S^2)$ which is the control signal applied to the motor. The invention provides for the lead compensation network shown in FIG. 5 interposed between the integrator and the motor, having a transform $(1+S/S)$. The output in FIG. 4 is $$\frac{1}{S^2} \times \frac{1}{1+S}$$

whereas in FIG. 5 the output after compensation becomes $$\frac{1}{S} \cdot \frac{1+S}{S} \times \frac{1}{1+S} = \frac{1}{S^2}$$

as required. The output is a ramp without any delay. Effective speed control of the load is obtained with a VCO in an open loop.

Figure 6A:
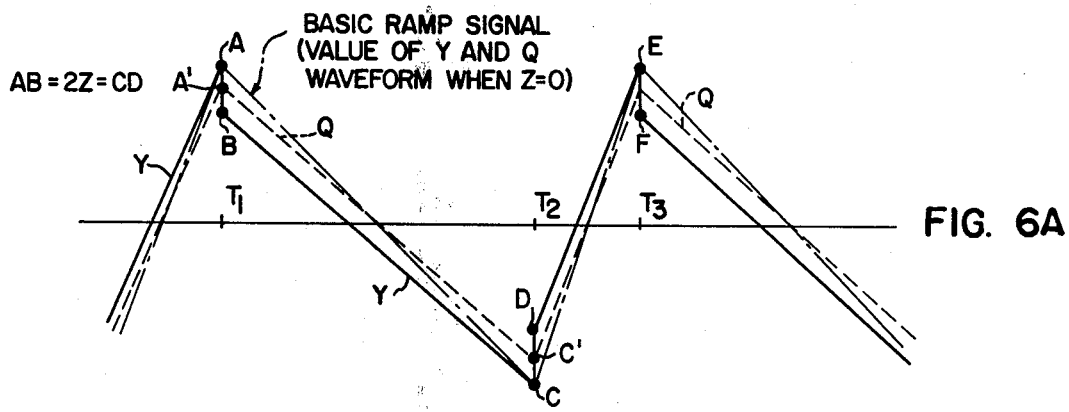
FIG. 6A shows a basic ramp signal ACE used to generate the particular ramp signal ABCDE according to the invention by summing up a square wave Z of proper amplitude, and also shows the composite ramp signal obtained.
Figure 6B:
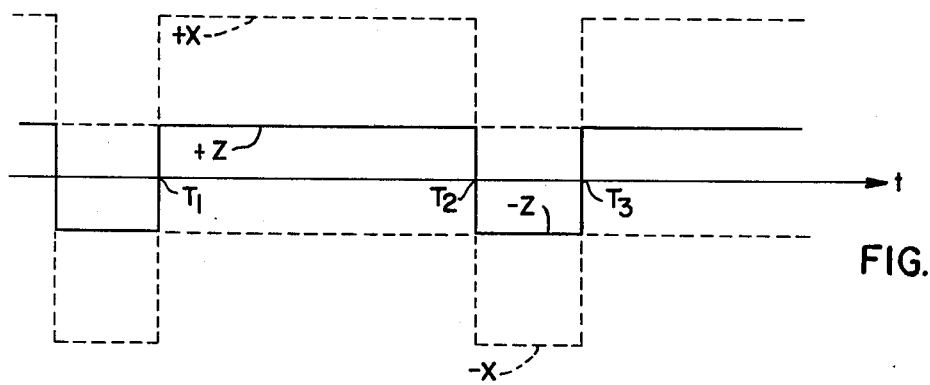
FIG. 6B shows the square wave used in FIG. 6A.

The saw-tooth generator 2 and summer 7 will now be described with particularity by reference to FIG. 6A, 6B and 7. FIG. 6A shows at ACE the desired saw-tooth curve having typically positive and negative peaks occurring at successive times $T_1$, $T_2$, $T_3$. FIG. 6B shows a square wave pulse Z having positive and negative levels of amplitude Z defined at the same time instants $T_1$, $T_2$, $T_3$. FIG. 6A shows further a ramp Q obtained with a ramp generator. The summing of curves Q and Z results in the composite curve Y of FIG. 6A, having a generally triangular waveform following ABCDE at the same time instants $T_1$, $T_2$, $T_3$ and exhibiting a jump after each peak, namely AB, CD and EF of amplitude 2Z.

Figure 7:
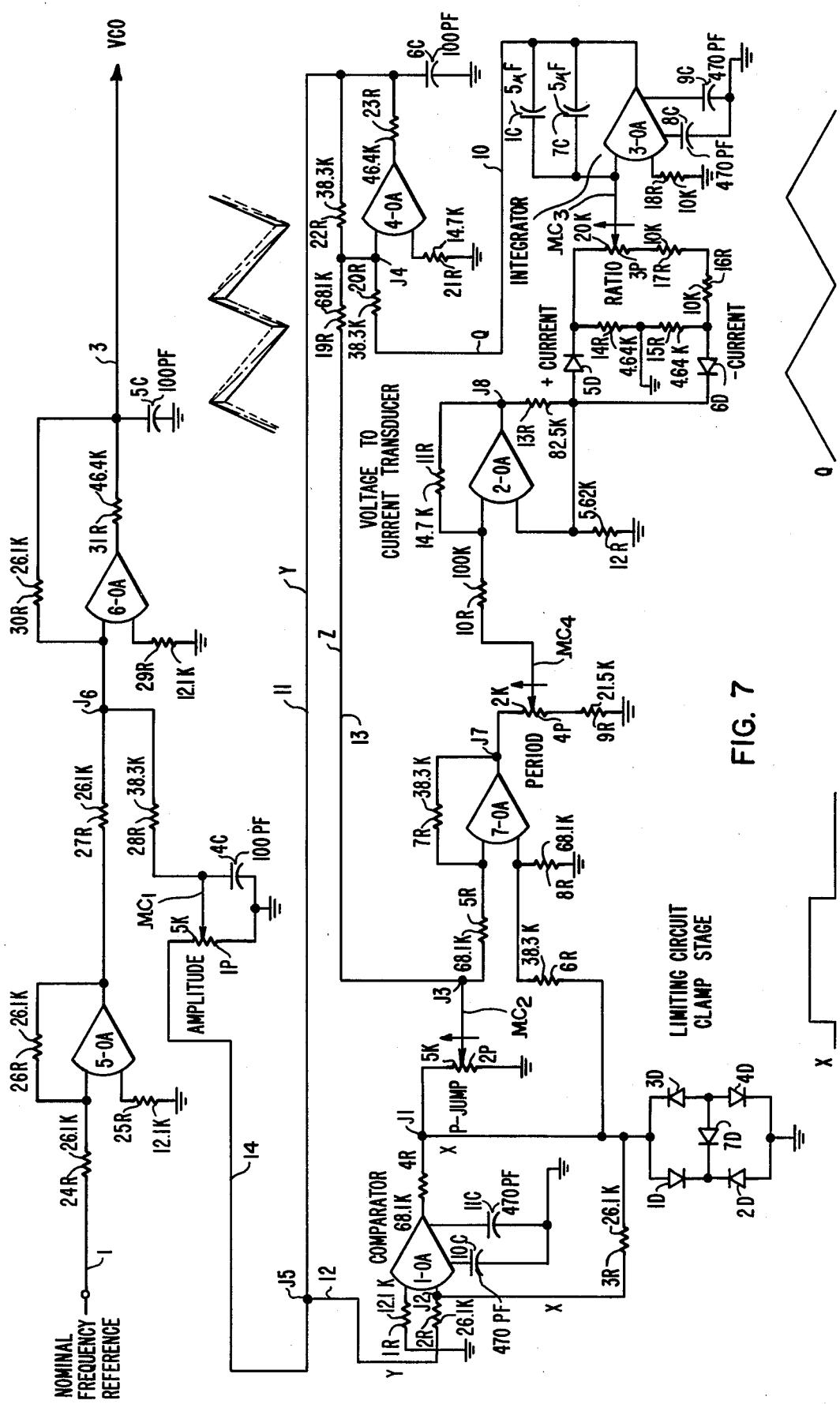
FIG. 7 provides the circuitry used for the preferred embodiment of the invention.

FIG. 7 shows, in detail, circuitry that can be used to generate curves Q and Z and combine them into Y as shown by FIG. 6.

Amplifiers 1-OA and 3-OA together form a multivibrator. Amplifier 3-OA is mounted as an integrator with feedback capacitors 1C and 7C being alternatively charged and discharged in opposite direction when a charging current is supplied by either of two input branches via a diode 5D for the positive polarity, or via a diode 6D for the negative polarity, a potentiometer 3P as part of a resistance divider 16R, 17R, 3P at one of the inputs of operational amplifier 3-OA. The integrator is conventionally connected otherwise. At its output on line 10 a triangular signal Q is derived. The output of operational amplifier 3-OA is fed back via lines 10, resistor 20R, resistor 22R, lines 11, 12 and resistor 2R to one input on pin 3 of operational amplifier 1-OA. Operational amplifier 1-OA is conventionally connected as a threshold comparator between the pin 3 input of 1-OA and its reference input on pin 2. The output, derived through resistor 4R, appears at junction point $J_1$ and is fed back via resistor 3R to junction point $J_2$, where it is summed with the first input on pin 3. As a result, the output signal X at $J_1$ switches according to the magnitude and polarity of the signal at junction $J_2$ which is the sum of signal X and signal Y. Referring to FIG. 6A, it is assumed that at time $T_1$ when Y has the value of point A on curve Y, the output of the operational amplifier at junction $J_1$ is saturated at the value $+X = +Y$. From A to C, Y is decreasing in magnitude when being positive, then increases negatively until at time $T_2$ it reaches $-Y$, where $|Y| = |X|$. At that moment $|Y|$ would tend to exceed the value $|X|$, therefore the threshold of the comparator is exceeded as $(-Y+X)$ changes sign. When junction $J_2$ changes sign the output of the operational amplifier saturates at the value $-X$. The process repeats itself from C to E for the opposite slope of curve Y. A clamping circuit connected between junction $J_1$ and ground is provided comprising diodes 1D, 2D, 3D and 4D mounted in a bridge at the two ends of a diagonal including a Zener diode 7D. This circuit maintains a predetermined indentical voltage at junction $J_1$ for the two opposite polarities of saturation of the amplifier. Typically, with the circuit of FIG. 7, if the output of the comparator is somewhat around 13 volts, the limiting effect of the clamp circuit is to establish for the value of signal X a voltage of ±8.9 volts with sufficient accuracy. Curve X is shown in dotted line in FIG. 6B.

From junction $J_1$, a potentiometer 2P provides at junction $J_3$ an adjustable fraction of the potential X. The potential at $J_3$ is represented by curve Z in FIG. 6B. A summing amplifier 4-OA receives at junction $J_4$ connected to its pin 2 input, two signals to be summed up, namely the ramp signal Q on line 10 from the integrator 3-OA and the Z signal on line 13 from junction $J_3$ and potentiometer 2P. As a result of such summation, by reference to FIG. 6A, the ramp signal along slope A'C' is translated to slope BC of signal Y. A jump 2Z is then created, as desired, after peak A and peak C on the resulting curve Y. It also appears from FIG. 7 that by adjusting potentiometer 2P the value of Z can be changed to obtain a suitable amount of jump at AB and CD. Signal Y from junction $J_5$ is supplied on line 14 together with the nominal frequency reference signal on line 1 to the summer 2. The latter, as shown in FIG. 7, includes an inverting unity gain amplifier 5-OA for signal $f_{ref}$ on line 1, and a potentiometer 1P, including a resistor 5K and a loop of capacitor 4C as a noise filter for signal Y on line 14. The two signals are summed up at junction $J_6$ via respective resistors 28R and 27R as shown. Junction $J_6$ is connected to the input pin 2 of an inverting and summing amplifier 6-OA, the output of which on line 3 is fed to the voltage control oscillator controlling the frequency of the inverter 6. Accordingly, the frequency of motor M follows as a function of time the magnitude of signal Y about a signal level fixed by the reference signal $f_{ref}$, as shown in FIG. 2. By adjusting the potentiometer 1P, it is possible to select the order of magnitude of curve (ST). Turning again to the description of the triangle generator in FIG. 7, the voltage at junction $J_3$ is applied via resistor 5R to a first input, on pin 2, of operational amplifier 7-OA, while the voltage at junction $J_1$ is applied via resistor 6R to the second input on pin 3 of 7-OA. Thus, while signal X is received at one input, the fraction of X which is Z is applied to the other input. The object of this particular circuit is to modify the voltage at the output of operational amplifier 7-OA at junction $J_7$ in such a way that any change of Z through adjustment of 2P, e.g. a change of AB and CD, will result in a proportional change of voltage at $J_7$ which alters the value of the slope of Q. This slope is thus altered so that the overall amplitude of Y, A minus C, and the overall period of the ascending and descending portions of Y, $T_3$ minus $T_2$ and $T_2$ minus $T_1$ respectively, remain practically constant.

From junction $J_7$, the voltage signal derived is converted into a current signal at junction $J_8$ by an operational amplifier operating as a voltage to current transducer. A potentiometer 4P is interposed between junction $J_7$ and the input on pin 2 of operational amplifier 2-OA. Operational amplifier 2-OA includes an input resistor 10R with pin 2, a feedback resistor 11R from $J_8$ to the first input, a resistor 12R from the second input on pin 3 to ground, and a feedback resistor 13R from junction $J_8$ to the second input, on pin 3. From the second end of resistor 13R two parallel branches are connected to the measuring input of the integrator amplifier 3-OA, including the aforementioned diode 5D for positive current and 6D for negative current, e.g. for the consecutive slopes of ramp signal Q. By changing the position of the arm of potentiometer 4P at the input of 2-OA, it is possible to vary the slope of both portions of the ramp Q, since the amount of current charging capacitors 1C and 7C is accordingly varied. Therefore, potentiometer 4P varies the total period of signal Y. Positive currents flowing through diode 5D are affected by the current divider consisting of 14R and 3P. Negative currents flowing through diode 6D are affected by the current divider consisting of 15R, 16R, 17R, and 3P. Changing the position of the arm of potentiometer 3P therefore affects the positive and negative currents proportionately and inversely. Thus, it is possible to change the relative importance of the two slopes of the ramp, i.e., the ratio between time $T_1$-$T_2$ and time $T_2$-$T_3$ for signal Y, without changing the total period time $T_1$-$T_3$.

From the preceding it appears that the circuitry of FIG. 7 permits the generation of a signal Y such as defined in FIG. 6, and that through four potentiometers 1P, 2P, 3P, 4P, placed after junction points $J_5$, $J_1$, $J_8$, and $J_7$, it is possible to independently adjust the magnitude of the Y signal, the value of the jump, the frequency and the ratio between consecutive slopes of this same signal Y.

I claim as my invention:

1. In a motor drive for imparting to a load having inertia reciprocal linear movement in accordance with an intended triangular waveform speed characteristic exhibiting peaks at opposite instants of reversal, including:

integrator means for generating a triangular waveform; and means responsive to a slope parameter control signal and operative on the input of said integrator means for imparting to said triangular waveform a slope and peaks in accordance with said intended triangular waveform, the combination of:

means responsive to a translation parameter control signal and operative with the output of said integrator means for causing a translation of said triangular waveform in accordance with the magnitude of said translation parameter control signal;

with said translation parameter control signal being subtracted from said slope parameter control signal at the input of said integrator means for changing the slope of said triangular waveform in accordance with the magnitude of said translation parameter control signal, whereby said translation parameter control signal responsive means is outputting a composite of a jump and a triangular waveform which is coterminous with the peaks of a waveform representative of said intended triangular waveform, said jump being proportional to twice the magnitude of said translation parameter control signal and being representative of a predetermined speed increment compensating for the inertia of the load so that said load follows substantially said triangular waveform speed characteristic.

2. The motor drive of claim 1, with current source means responsive to said slope parameter control signal responsive means and operative on the input of said integrator means for establishing consecutive wave slopes of alternate polarities in relation to the respective said peaks, means being provided for selectively biasing said slope equally and in opposite directions, thereby to change the slope ratio while maintaining the peak-to-peak time relationship for a common peak polarity.

3. The motor drive of claim 2 with means responsive to said slope parameter control signal responsive means and operative on said current source means for selectively changing said peak-to-peak time relationship for a common peak polarity, thereby to adjust the occurrence frequency of said basic triangular waveform.

* * * * *